United States Patent
Alstad et al.

(10) Patent No.: US 10,630,758 B2
(45) Date of Patent: Apr. 21, 2020

(54) METHOD AND SYSTEM FOR FULFILLING SERVER PUSH DIRECTIVES ON AN EDGE PROXY

(71) Applicant: RADWARE, LTD., Tel Aviv (IL)

(72) Inventors: Kent Douglas Alstad, Roberts Creek (CA); Roy Berland, Tel Aviv (IL)

(73) Assignee: RADWARE, LTD., Tel Aviv (IL)

( * ) Notice: Subject to any disclaimer, the term of this patent is extended or adjusted under 35 U.S.C. 154(b) by 39 days.

(21) Appl. No.: 15/147,507

(22) Filed: May 5, 2016

(65) Prior Publication Data

US 2016/0330269 A1      Nov. 10, 2016

Related U.S. Application Data

(63) Continuation-in-part of application No. 15/052,322, filed on Feb. 24, 2016.

(60) Provisional application No. 62/157,663, filed on May 6, 2015.

(51) Int. Cl.
| | | |
|---|---|---|
| *G06F 15/16* | (2006.01) | |
| *H04L 29/08* | (2006.01) | |
| *H04L 29/06* | (2006.01) | |

(52) U.S. Cl.
CPC .............. *H04L 67/06* (2013.01); *H04L 67/02* (2013.01); *H04L 67/1097* (2013.01); *H04L 67/26* (2013.01); *H04L 67/2852* (2013.01); *H04L 67/42* (2013.01)

(58) Field of Classification Search
CPC ..... H04L 67/06; H04L 67/02; H04L 67/1097; H04L 67/26; H04L 67/2852; H04L 67/42

USPC ........................................................ 709/203
See application file for complete search history.

(56) References Cited

U.S. PATENT DOCUMENTS

| | | | |
|---|---|---|---|
| 9,307,052 B1* | 4/2016 | Alstad | H04L 67/02 |
| 2002/0087797 A1* | 7/2002 | Adrangi | G06F 12/0888 711/133 |
| 2004/0243704 A1* | 12/2004 | Botelho | G06F 16/958 709/224 |
| 2005/0108418 A1 | 5/2005 | Bedi et al. | |
| 2007/0067569 A1* | 3/2007 | Vittal | G06F 12/0804 711/118 |
| 2012/0096106 A1* | 4/2012 | Blumofe | G06Q 50/00 709/213 |
| 2014/0149531 A1* | 5/2014 | Chung | H04L 67/2842 709/213 |
| 2015/0012835 A1* | 1/2015 | Wong | G06F 16/9574 715/738 |

(Continued)

Primary Examiner — Taylor A Elfervig
(74) Attorney, Agent, or Firm — M&B IP Analysts, LLC

(57) ABSTRACT

A system and method for accelerating content deliver over a content delivery network (CDN) are provided. In an embodiment, the method includes determining, based on a received hypertext transfer protocol (HTTP) request, a PUSH list, wherein the PUSH list includes at least one resource that can be immediately provided to a web browser without requesting the at least one resource from an origin server; and issuing, based on the PUSH list, at least one PUSH resource designator to an edge proxy, wherein each PUSH resource designator indicates one of the at least one resource, wherein the edge proxy is commutatively connected in geographic proximity to a client running the web browser, wherein the origin server and the edge proxy communicate over the CDN.

27 Claims, 5 Drawing Sheets

(56) References Cited

U.S. PATENT DOCUMENTS

2015/0296047 A1* 10/2015 Ghazisaidi .............. H04L 65/80
709/219
2016/0248866 A1* 8/2016 Garas ...................... H04L 67/26
2016/0285989 A1* 9/2016 Zhang ................. H04L 67/2823

* cited by examiner

METHOD AND SYSTEM FOR FULFILLING SERVER PUSH DIRECTIVES ON AN EDGE PROXY

CROSS-REFERENCE TO RELATED APPLICATIONS

This application claims the benefit of U.S. Provisional Patent Application No. 62/157,663 filed on May 6, 2015, the contents of which are hereby incorporated by reference. This application is also a continuation-in-part of U.S. patent application Ser. No. 15/052,322 filed on Feb. 24, 2016, now pending, the contents of which are hereby incorporated by reference.

TECHNICAL FIELD

The disclosure generally relates to techniques for accelerating content deliver over content delivery networks (CDNs).

BACKGROUND

Hypertext Transfer Protocol version 2 (HTTP/2) is a new version of the HTTP network protocol used by the World Wide Web. HTTP/2 is based on SPDY® and is designed for transporting web content with goals of reducing web page load latency and improving web security. This reduced latency is achieved via compression, multiplexing, and prioritization of webpage sub-resources across a single connection per client. The current HTTP/2 version published as RFC 7540 in May 2015 (ISSN: 2070-1721).

Existing web sites and applications can still operate with older versions of HTTP (such as HTTP versions 1 or 1.1 (hereinafter HTTP/1)), but new web sites and/or web applications can take advantage of new features introduced by HTTP/2 to increase speed. In particular, to accelerate delivery of resources to browsers, HTTP/2 suggests a server PUSH mechanism. The server PUSH mechanism involves sending a resource directly to a web browser of a client (client browser) without first receiving a request for the resource. Thus, the HTTP server PUSH mechanism allows for pushing resources (e.g., images, HTLM documents, scripts, etc.) from an origin server into a client browser's cache independently of the browser's HTTP requests.

The PUSH mechanisms can also serve as mechanisms for pushing resources to a client device using HTTP/2. That is, by implementing PUSH mechanisms, an HTTP/2-based server can be configured to provide data for rendering a web page prior to client browser based on examination of a response.

A content delivery network (CDN) is a large distributed system of servers deployed in multiple data centers across the Internet. The goal of a CDN is to serve content to end-users (client browsers or applications) with high availability and high performance. CDNs serve a large fraction of the Internet content today, including web objects (text, graphics, and scripts), downloadable content, applications, live streaming media, on-demand streaming media, and social networks.

CDN nodes are usually deployed in multiple locations, often over multiple backbones. This allows for reducing bandwidth costs, improving page load times, and/or increasing global availability of content. The number of nodes and servers making up a CDN varies depending on the architecture, with CDNs reaching thousands of nodes with tens of thousands of servers.

Requests for content as initiated by browsers are typically directed to CDN nodes that are optimal in some way. For example, when optimizing for performance, locations that are best for serving content to the user may be chosen. Most CDN providers offer their services over a varying, defined set of edges or "edge networks", depending on the geographic coverage desired.

With the acceleration capacities of HTTP/2, it would be advantageous to enable CDN nodes to more efficiently serve requests using HTTP/2. Particularly, existing solutions provide no support for end-to-end HTTP/2 communication between the clients and servers.

Further, existing solutions do not provide any mechanism to determine the optimal push strategy for resources and/or to push resources to various CDN nodes and from such nodes to clients according to an optimal push strategy.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

The embodiments disclosed herein include a method for accelerating content deliver over a content delivery network (CDN). In an embodiment, the method includes determining, based on a received hypertext transfer protocol (HTTP) request, a PUSH list, wherein the PUSH list includes at least one resource that can be immediately provided to a web browser without requesting the at least one resource from an origin server; and issuing, based on the PUSH list, at least one PUSH resource designator to an edge proxy, wherein each PUSH resource designator indicates one of the at least one resource, wherein the edge proxy is commutatively connected in geographic proximity to a client running the web browser, wherein the origin server and the edge proxy communicate over the CDN.

The embodiments disclosed herein also include a system for accelerating content delivery over a content delivery network (CDN). In an embodiment, the system includes a processing unit; and a memory, the memory containing instructions that, when executed by the processing unit, configure the system to: determine, based on a received hypertext transfer protocol (HTTP) request, a PUSH list, wherein the PUSH list includes at least one resource that can be immediately provided to a web browser without requesting the at least one resource from an origin server; and issue, based on the PUSH list, at least one PUSH resource designator to an edge proxy, wherein each PUSH resource designator indicates one of the at least one resource, wherein the edge proxy is commutatively connected in geographic proximity to a client running the web browser, wherein the origin server and the edge proxy communicate over the CDN.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
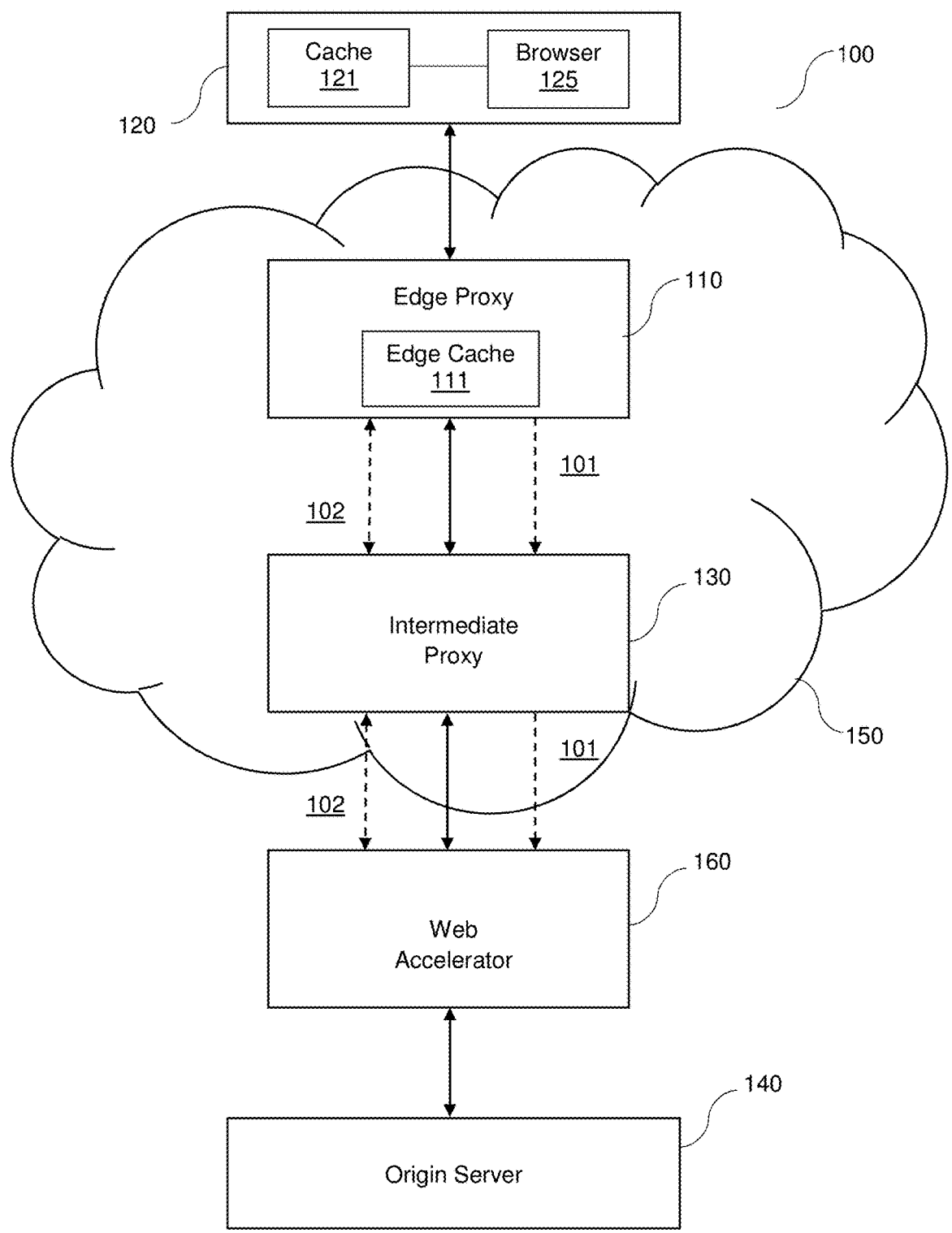
FIG. 1 is a block diagram of a CDN topology utilized to describe the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an example block diagram of a CDN topology 100 utilized to describe the various disclosed embodiments. The example topology 100 includes an edge proxy 110, a client device 120 (hereinafter referred to as a "client"), an intermediate proxy 130, an origin server 140, and a web accelerator 160. In an embodiment, the acceleration is achieved through generating, by the web accelerator 160, PUSH lists designating resources that can be pushed from the edge proxy 110 to the client 120. In an embodiment, such resources are communicated to the edge proxy 110 by propagating PUSH resource designators to the edge proxy 110. The various embodiments for generating PUSH lists and propagating PUSH resource designators are discussed below.

In the example configuration shown in FIG. 1, the edge proxy 110 and the intermediate proxy 130 are part of a CDN 150. Typically, the edge proxy 110 is positioned in geographic proximity to the client 120, and an intermediate proxy 130 is positioned in geographic proximity to an origin server 140. In a typical configuration, the edge proxy 110 includes an edge cache 111, which may be a local or distributed cache. The edge cache 111 can be used for storing resources and previously retrieved PUSH resource designators. The edge cache 111 can be implemented at the edge proxy 110 according to known methods.

The CDN 150 is a large distributed system of servers deployed in multiple data centers across the Internet. The CDN 150 typically includes a plurality of nodes that are usually deployed in multiple locations, often over multiple backbones. Merely for the sake of simplicity and without limiting the disclosed embodiments, such nodes and backbones are not illustrated in FIG. 1.

In an embodiment, the origin server 140 may be an HTTP server, a web server, or any other server. The client 120 may be an HTTP client or any other electronic device capable of sending and receiving content over, for example, the Internet or any other type of network. The client 120 may include, but is not limited to, a desktop computer, a laptop computer, a smartphone, a music player, a handheld computer, a tablet computer, a kiosk, a game system, an enterprise computing system, a server computer, and the like. In one embodiment, the client 120 includes a local cache 121, which can be used for storing resources retrieved from the origin server 140 for later use. The local cache 121 can be implemented at the client 120 according to well-known methods.

In one embodiment, the client 120 and/or the origin server 140 each include a number of hardware components as are well known to those skilled in the art, including for example one or more input devices, one or more processors, a memory, and/or a local storage. Such hardware components are well known in the art of computing architecture and are thus omitted from FIG. 1 for clarity.

In one embodiment, the client 120 executes a client browser 125 and/or another software application for enabling network communications and/or rendering of webpages or web content. For illustrative purposes, the disclosed embodiments are described herein in terms of a request for a web page issued by the client browser 125 running on the client 120. The client 120 may further include the local cache 121 for storing previously received resources. In one embodiment, the cache 121 is associated with the browser 125, although the cache 121 can be separate from the browser 125 and can be any local cache for use by the client 120.

The end-to-end communication between the client 120 and the origin server 140 can be facilitated using any communication protocol(s) such as, but not limited to, HTTP version 1 (HTTP/1), HTTP/2, secure hypertext transfer protocol (HTTP), transmission control protocol/Internet protocol (TCP/IP), and the like. In some embodiments, secure access to the CDN 150 may be facilitated via well-known techniques such as a Virtual Private Network (VPN), although such secure access is not required.

Specifically, the application layer communication protocols between the client 120 and the origin server 140 may be facilitated using HTTP/1, HTTP/2, or a combination thereof. For example, the origin server 140 and the intermediate proxy 130 may communicate over HTTP/1 through the web accelerator 160, while the client 120 and the edge proxy 110 may communicate over HTTP/2.

In an embodiment, the web accelerator 160 is deployed between the origin server 140 and the CDN 150. The web accelerator 160 is configured to accelerate the delivery of content from the CDN 150 by generating PUSH lists including PUSH resource designators for resources to be pushed to the client browser 125. The PUSH resource designators are sent to the edge proxy 110 for fulfillment via, e.g., propagation to the client browser 125. The PUSH resource designators indicate resources (e.g., images, multimedia files, HTML documents, CSS files, script files, etc.) that can be pushed to the client browser 125 without waiting for the retrieval of such resources from the origin server 140 and, in an embodiment, prior to receiving a HTTP request at the origin server 140. Thus, the web accelerator 160 is configured to enable the transmission of data while waiting for the origin server 140, thereby accelerating the delivery (and rendering) of the contents of the resources on the client browser 125.

In an embodiment, the generation of PUSH lists is based on learning of traffic directed to and from the origin server 140. To this end, the web accelerator 160 may be configured to intercept, capture, and analyze, for example, HTTP requests and corresponding response pairs. Based on the analysis, the PUSH lists are generated and maintained. A PUSH list may be associated with a particular request or a context of a request (identified by an index), and may include metadata utilized to retrieve resources needed for a response to the serve request and/or for responses to related requests.

In one embodiment, request-response pairs across multiple clients for each request are captured and recorded by the web accelerator 160. In effect, capturing permits classification of all requests such that, upon analysis of multiple captured request-response pairs, a PUSH list including resource designators of common resources previously required across multiple clients' requests can be generated and maintained. This common PUSH list ensures that, for any request to a website hosted by the origin server 140, a list of resource designators may be made available. As a result, for future requests, the list of resource designators can be pushed, to the client 120, asynchronously and in an optimized order.

In an embodiment, based on the resources designated in a PUSH list one or more PUSH resource designators are issued and sent to the edge proxy 110. In an embodiment, each resource can be designated in a PUSH resource designator sent to the edge proxy 110. The order of sending PUSH resource designators may by prioritized based on one or more logical criteria.

Alternatively, information associated with the resources may be aggregated in a predefined list comprising data chunks. Each such data chunk represents the required headers and URL of the pushed resource. An example data chunk may be: [www.kkk.com/images/aaa.jpg, content-type:image].

In another embodiment, the resources designated by the PUSH resource designators are gathered as the value of a special header (for example: fv-push-list) that is encoded with HPACK encoding. The URL in such a PUSH resource designator is uniquely encoded to allow for identification by the edge proxy 110.

In an embodiment, the web accelerator 160 is configured to support both HTTP/1 and HTTP/2 protocols. Specifically, the communication between the web accelerator 160 and the origin server 140 may be conducted based on a protocol supported by the origin server 140. That is, if the origin server 140 supports HTTP/2, a request (e.g., a HTML request) may be sent over HTTP/2. If the origin server 140 does not support HTTP/2, a termination of HTTP/2 protocol may be performed at the web accelerator 160, and the request is sent to the origin sever 140 over HTTP/1.

In one configuration, when the end-to-end connection utilizes HTTP/2, the client browser 125 typically connects to the closest CDN edge proxy (e.g., the edge proxy 110) using a transport layer security (TLS) encrypted connection or the like. As an example, an application-layer protocol negotiation (ALPN) extension may be utilized such that the client browser 125 negotiates an HTTP/2 session with the edge proxy 110. The edge proxy 110 advertises the ALPN extension to the web accelerator 160, which in turn negotiates the ALPN extension with the origin server 140. As a result, an end-to-end HTTP/2 connection may be achieved.

Two sets of data flows 101 and 102 may be carried through the CDN 150. The first data flow 101 includes the propagation of the TLS handshake carrying the ALPN extension data from the client browser 125 to a termination (not shown) at the web accelerator 160. The second data flow 102 carries the propagation of HTTP/2 session data. In the example CDN topology 100 shown in FIG. 1, the first data flow 101 is uni-directional and the second data flow 102 is bi-directional.

The edge proxy 110 may store some or all of the resources designated in the PUSH resource designators in an edge cache 111. Thus, the edge proxy 110 is configured to serve or otherwise fulfill PUSH resource designators using, in part, resources cached in the edge cache 111. In an embodiment, the edge proxy 110 is configured to support HTTP/2 at least for a connection with the client 120 or with the origin server 140.

In an embodiment, the web accelerator 160 can be realized as a standalone appliance (e.g., a physical or virtual appliance), integrated in the intermediate proxy 130 or integrated in a network device, such as a load balancer or an application delivery controller (ADC). In certain embodiments, the web accelerator 160 can be further implemented as software, firmware, hardware, or combination thereof. According to some embodiments, the web accelerator 160 can be implemented as a hardware component. Examples for hardware components include general-purpose microprocessors, multi-core processors, microcontrollers, digital signal processors (DSPs), field programmable gate array (FPGAs), programmable logic devices (PLDs), application specific integrated circuits (ASICs), controllers, state machines, gated logic, discrete hardware components, dedicated hardware finite state machines, or any other suitable entities that can perform calculations or other manipulations of information.

It should be appreciated that the particular arrangement of elements shown in FIG. 1 is merely an example, and that the disclosed embodiments can be implemented using different elements configured in any of a number of different ways. Thus, the particular architecture shown in FIG. 1 is merely illustrative and is not intended to limit the scope of the disclosure in any way.

It should be further appreciated that any number of devices, individually or in any combination, may be configured to fulfill the roles of the edge proxy 110, the client 120, intermediate proxy 130, the origin server 140, and/or the web accelerator 160 described herein without departing from the scope of the disclosed embodiments. Moreover, in certain implementations, the intermediate proxy 130 can be a part of the CDN's infrastructure or a gateway in the server's 140 network or a dedicated system connected to the web accelerator 160. The disclosed embodiments can be realized regardless of the specific implementation of the intermediate proxy 130. In some embodiments, the intermediate proxy 130 is not included in the CDN 150.

Figure 2:
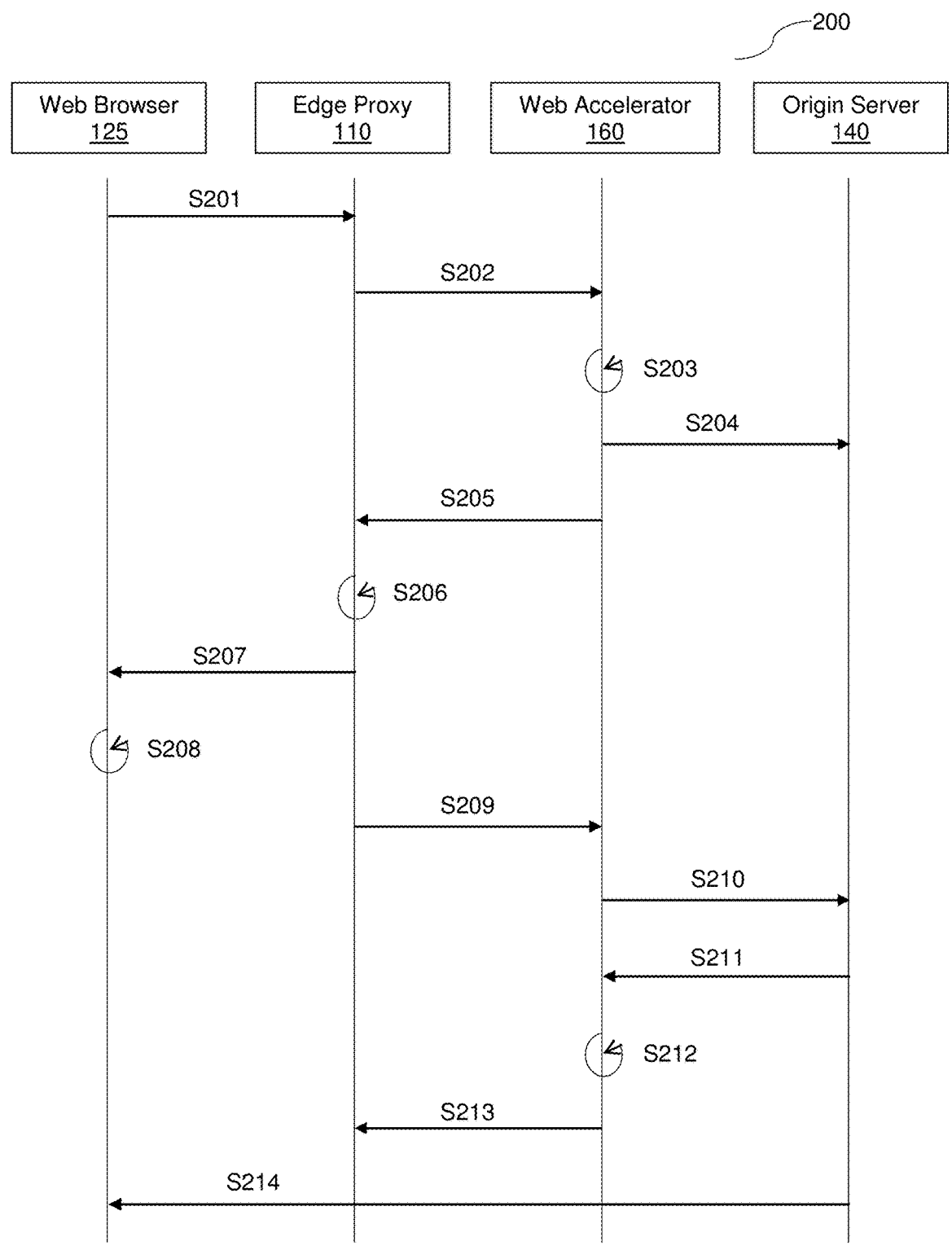
FIG. 2 is a sequence diagram depicting the acceleration of content delivery in an end-to-end HTTP/2 architecture according to an embodiment.

FIG. 2 is an example sequence diagram 200 depicting the acceleration of content delivery when an end-to-end implementation of HTTP/2 in a CDN (e.g., the CDN 150) is utilized. That is, in the CDN topology 100 discussed with respect to FIG. 2, the HTTP/2 is utilized to communicate between the client browser 125 and the origin server 140. The elements depicted are described in more detail above. In the embodiment illustrated in the example sequence diagram 200, the CDN 150 does not include the intermediate proxy 130.

In an embodiment, to allow communication between the client 120 and the origin server 140, there are three active TCP connections: 1) from the client browser 125 to the edge proxy 110; 2) from the edge proxy 110 to the web accelerator 160; and 3) from the web accelerator 160 to the origin server 140.

At S201, upon establishing a connection (e.g., a HTTP/2 connection) between the web browser 125 and the edge proxy 110, the web browser 125 sends a request for a requested HTML page. The request may be a GET HTTP/2 request encapsulated in a HEADERS frame. In an embodiment, the edge proxy 110 does not keep the requested HTML in its cache and, therefore, the edge proxy 110 may open a backend connection with the web accelerator 160 (e.g., a backend TCP connection). Such connection is terminated at the web accelerator 160.

At S202, the request is sent from the edge proxy 110 to the web accelerator 160 via the backend connection. The request may include a special header indicating that the request is received from an edge proxy 110 with a front-end HTTP/2 session. Such a special header allows distancing between cases where a resource is pushed from the edge proxy 110 and cases where a resource is pushed to the web browser 125 when communicating directly with the server 140.

At S203, the web accelerator 160 is configured to terminate the received request for the HTML and to generate a PUSH list based on the received request. In an embodiment, at least a portion of the PUSH list may be retrieved from database (not shown). The retrieval of a PUSH list from the database may be performed using an index computed over data (e.g., URL, HTTP headers, and/or the like) included in or based on the context of received request.

At S204, the web accelerator 160 is configured to forward the received request to the origin server 140. In an embodiment, the request is sent over HTTP/2. In another embodiment, when the origin server 140 does not support HTTP/2, the web accelerator 160 is configured to terminate the HTTP/2 connection and to forward the request to the origin sever 140 over the HTTP/1 connection.

At S205, upon generation and/or retrieval of a PUSH list, the web accelerator 160 is configured to issue a set of PUSH resource designators and to send the such PUSH resource designators to the edge proxy 110. A PUSH resource designator is used to communicate to the edge proxy 110 and the web browser 125 that a specific resource can be provided to the browser 125 not from the origin server. In an embodiment, each PUSH resource designator is generated in a format of a PUSH_PROMISE frame as defined in the HTTP/2 RFC. Various embodiments for issuing or otherwise generating the PUSH resource designators are discussed in greater detail above. In certain implementations, S204 and S205 may be performed at a different order or in parallel.

At S206, upon receipt of the PUSH resource designators from the web accelerator 160, the edge proxy 110 searches, in the edge cache 111, for the resources indicated in each of the received PUSH resource designators.

At S207, for each received PUSH resource designator, if the corresponding resource (i.e., a designated resource) is found in the edge cache 111, the PUSH resource designator (promise) is fulfilled. Fulfilling the PUSH resource designator includes sending, from the edge proxy 110 to the web browser 125, the PUSH resource designator (e.g. a PUSH_PROMISE frame) followed by resource data. If the corresponding resource is not found in the edge proxy cache 110, the PUSH resource designator is unfulfilled.

At S208, for each PUSH resource designator, it is checked if the corresponding resource data is found in the local cache 121 and, if so, the PUSH resource designator is cancelled and the found corresponding resource data is not sent to the client browser 125. Cancelling PUSH resource designators for resource data that already exists in a local cache 121 reduces computing resources by avoiding sending unnecessary data.

At S209, for each PUSH resource designator, regardless of whether the resource data was found, the edge proxy 110 generates and sends a reset message (e.g., a RESET_STRM frame) to the web accelerator 160 indicating that the web accelerator should cancel the PUSH resource designator. In response, the web accelerator 160 is configured to cancel the received PUSH resource designator. This cancellation is performed at least in order to avoid sending redundant data from the web accelerator 160. The HEADERS and RESET_STRM frames are defined in the HTTP/2 RFC.

It should be noted that S205 through S209 can be repeated for each PUSH resource designator. In an alternative embodiment, instead of sending one PUSH resource designator for every resource in the PUSH list, the resources may be aggregated to a predefined resource designator list including chunks. In such embodiments, there is no need to repeat S205 through S209 because the resource designator list will indicate all of the resources that can be pushed.

At S210, the web accelerator 160 is configured to request from the origin server 140 each of the resources designated in the PUSH resource designators which are not cached at the edge proxy 110. In an embodiment, S210 may be performed while resources are pushed to the client browser 125 from the edge proxy 110. In response, at S211, the web accelerator 160 is configured to receive the such resources from the origin server 140.

At S212, the web accelerator 160 is configured to cache the received designated resources. At S213, the web accelerator 160 is configured to forward the cached resources to the edge proxy 110.

At S214, the response (e.g., the HTML page) is returned from the origin server 140 to the web browser 125. It should be noted that the response may not include the complete HTML page, as certain resources are already pushed via the edge proxy 110 and rendered by the client browser 125. Returning only select portions of a response allows for at least faster rendering of requested content. As an example, when the static portions of an HTML page are encoded in JavaScript® and rendered as HTML by the web browser 125 (e.g., rendering framework such Angular.js or React.js), only the dynamic portions of the HTML page are returned from the origin server 140, while the static portions are pushed to the web browser 125 from the edge proxy 110.

Figure 3:
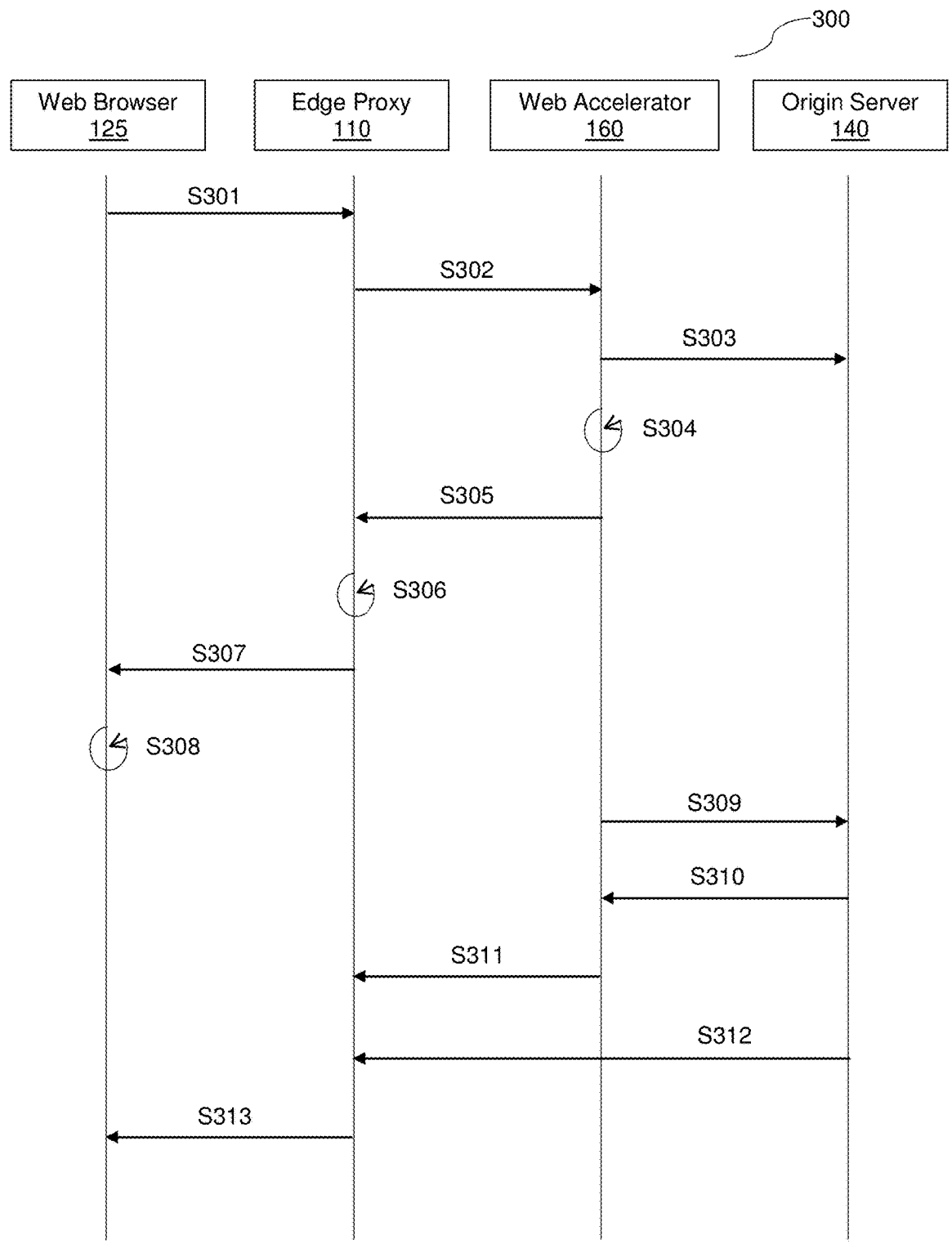
FIG. 3 is a sequence diagram depicting the acceleration of content delivery in a hybrid HTTP/2 and HTTP/1 architecture according to an embodiment.

FIG. 3 is an example sequence diagram 300 depicting an operation of a disclosed embodiment when a hybrid implementation of HTTP/2 and HTTP/1 (including any subsequent protocol version, e.g., HTTP/1.1) is utilized in the CDN topology 150. In the example sequence diagram 300, the edge proxy 110 is used as a HTTP/2 to HTTP/1 gateway, i.e., the edge proxy 110 is operable to allow transmission of requests and/or resources between the web browser 125 and the origin server 140 enabled for different HTTP protocols. The disclosed embodiments discussed herein with respect to FIG. 3 allow for the transmission of PUSH lists including PUSH resource designators to the edge proxy 110.

At S301, upon the web browser 125 establishing a HTTP/2 connection with the edge proxy 110, the web browser 125 sends a request for a HTML page. The request may be a GET HTTP/2 request encapsulated in a HEADERS frame. In an embodiment, the edge proxy 110 does not keep the requested HTML in its cache and, therefore, the edge proxy 110 may open a backend connection (e.g., a backend TCP connection) with the web accelerator 160. Such a connection is terminated at the web accelerator 160.

At S302, the edge proxy 110 converts the HTTP/2 request to a HTTP/1 request and sends the converted request to the web accelerator 160. The conversion may include translating the HEADERS frame of the HTTP/2 request to that of an HTTP/1 request and sending the HTTP/1 request including the translated header to the web accelerator 160. In an embodiment, the edge proxy 110 is configured to insert a special header in the translated HTTP/1 request. Such a special header indicates that this request belongs to a client communicating using HTTP/2.

At S303, the web accelerator 160 is configured to forward the HTTP/1 request to the origin server 140.

At S304, upon receiving the HTTP/1 request with the special header, the web accelerator 160 is configured to generate or otherwise retrieve the PUSH list based on the received request. In an embodiment, the PUSH list, or a portion thereof, may be retrieved from a database (not shown) based on the special header in the received request. In another embodiment, the web accelerator 160 is configured to generate the PUSH list, or a portion thereof, based on an analysis of the special header. Upon generation and/or retrieval of a PUSH list, the web accelerator 160 is configured to issue a set of PUSH resource designators. In certain implementations, S303 and S304 may be performed in a different order or in parallel.

At S305, the web accelerator 160 is configured to create and send a special reply to the edge proxy 110. In an embodiment, such a special reply includes a response line and headers. One of the headers in the reply further includes one or more PUSH resource designators. As an example, the "100-continue HTTP/1.1" message can be included in the special reply. The edge proxy 110 and/or the web browser 125 cannot respond to the special reply.

At S306, upon receiving the special reply, the edge proxy 110 is configured to extract the PUSH resource designators from the special header to be sent to the web browser 125. In a further embodiment, S306 further includes the edge proxy 110 searching in its cache for the resources associated with the PUSH resource designators.

At S307, for each received PUSH resource designator, if the corresponding resource (i.e., resource designated by the PUSH resource designator) is found in the edge cache 111, the PUSH resource designator is fulfilled. Fulfilling the PUSH resource designator includes sending, from the edge proxy 110 to the web browser 125, the PUSH resource designator (e.g., PUSH_PROMISE frame) followed by corresponding resource data. If the corresponding resource is not found in the edge proxy's cache, the PUSH resource designator is unfulfilled.

At S308, for each PUSH resource designator, it is checked if the corresponding resource data is found in the local cache 121 and, if so, the PUSH resource designator may be cancelled and the found corresponding resource data is not sent to the web browser 125. Cancelling PUSH resource designator for resource data that already exists in a local cache reduces computing resources by avoiding sending unnecessary data. In an embodiment, after the PUSH resource designators are sent, the edge proxy 110 immediately begins sending the data resources corresponding to the PUSH resource designator until the web browser 125 responds by cancelling the PUSH resource designator by, e.g., sending a RESET_STREAM with a "cancel" error value.

It should be noted that S306 through S308 can be repeated for each PUSH resource designator. In an embodiment, a header of the special reply may include an aggregated list of resource designators. In such embodiments, there is no need to repeat S306 through S308 because the aggregated list will indicate all of the PUSH resource designators. It should be noted that the edge proxy 110 is configured to extract each resource designator from the list and check if the corresponding resource is saved in its cache.

At S309, the web accelerator 160 is configured to request, from the origin server 140, designated resources which are not cached at the edge proxy 110 and/or web browser's 125 cache. In an embodiment, S309 may be performed while resources are pushed to the client browser 125 from the edge proxy 110.

At S310, the web accelerator 160 is configured to receive the designated resources from the origin server 140 and to cache the received resources. The resources sent by the origin server 140 are based on the requests sent at S309.

At S311, the web accelerator 160 is configured to forward the cached resources to the edge proxy 110.

At S312, the origin server returns, to the edge proxy 110, the requested HTML of the initial request. The requested HTML may be returned as, e.g., a HTTP/1 response.

At S313, upon receiving the requested HTML, the edge proxy 110 translates the requested HTML to an HTTP/2 response and sends the translated HTTP/2 response to the web browser 125. This translation allows for initiation of a PUSH behavior at the edge proxy 110 even if only the front end connection is using HTTP/2.

It should be noted that the embodiments described herein above with respect to FIGS. 2-3 are described with respect to FIG. 1 merely for simplicity purposes and without limitation on the disclosed embodiments. The disclosed embodiments of FIGS. 2-3 are not limited to the particular network topology arrangement shown in FIG. 1.

Figure 4:
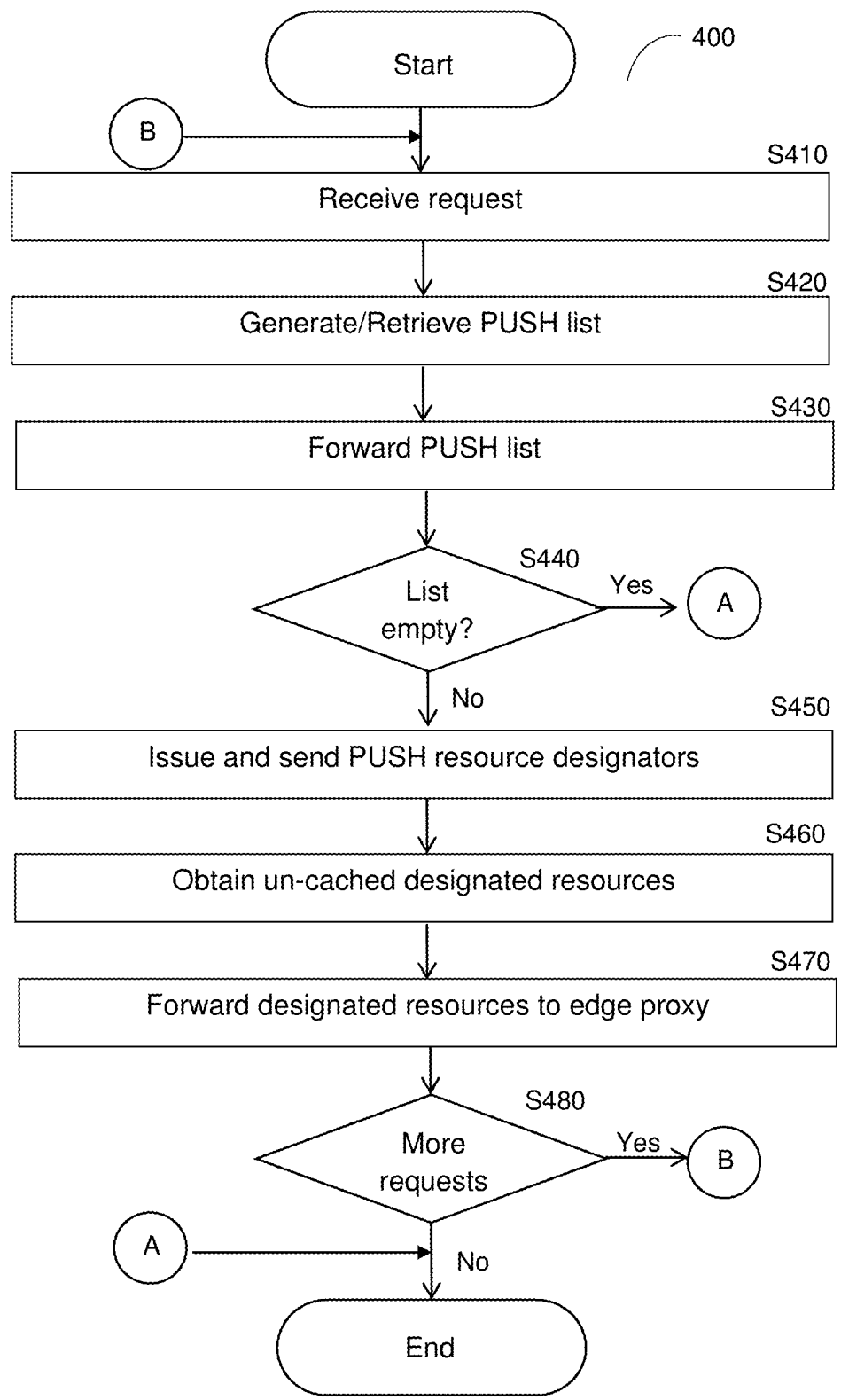
FIG. 4 is a flowchart illustrating a method for acceleration of content delivery according to an embodiment.

FIG. 4 is an example flowchart 400 illustrating a method for acceleration of content delivery by fulfilling server PUSH directives according to an embodiment. The edge proxy may be an edge proxy which is geographically proximate to the client. In an embodiment, the method may be performed by a device communicatively connected between an edge proxy and an origin server. For example, the method may be performed by the web accelerator 160.

At S410, a request is received from the edge proxy. In an embodiment, the received request is a HTTP/2 GET request encapsulated in a HEADERS frame. In another embodiment, the received request may include a special header indicating that the request is from an edge proxy with a front-end HTTP/2 session.

At S420, a PUSH list is generated and/or retrieved based on the received request. In an embodiment, S420 may further include retrieving and/or generating the PUSH list using the special header in the request.

At S430, the received request is forwarded to the origin server. In an embodiment, S430 may further include determining whether the origin server supports HTTP/2 and, if not, terminating an HTTP/2 session. In a further embodiment, upon termination of the HTTP/2 session, the request is forwarded to the origin server using, e.g., the HTTP/1 protocol. In certain implementations, S420 and S430 may be performed at a different order or in parallel.

At S440, it is determined whether the PUSH list is empty and, if so, execution terminates; otherwise, execution continues with S450. A PUSH list may be empty if, for example, the request, the source (client), and/or the destination (origin server) are newly encountered and the device (e.g., a web accelerator) is still in a learning mode.

At S450, one or more PUSH resource designators are issued based on the PUSH list. Issuing the PUSH resource designators may include, but is not limited to, generating PUSH resource designators based on the PUSH list and sending the PUSH resource designators to the edge proxy. In response to receiving the PUSH resource designators, the edge proxy searches an edge cache (e.g., its local or distributed cache) associated with the edge proxy for the resources corresponding to the PUSH resource designators. The edge proxy may respond by indicating whether each designated resource is cached at the edge cache.

In another embodiment, S450 may include sending a special reply to the edge proxy. The special reply may include, but is not limited to, a response line and headers. The headers may include one or more PUSH resource designators. The edge proxy may, in turn, extract the PUSH resource designators from the special reply headers. As noted above, each PUSH resource designator may be in a format of a PUSH_PROMISE frame. Further, a plurality of PUSH resource designators can be aggregated in a list including data chunks. Each such data chunk represents the required headers and URL of a pushed resource.

At optional S460, designated resources which are not cached at the edge proxy are obtained. The designated resources may be obtained by receiving and/or retrieving the designated resources from the origin server. To this end, a list of designated resources that are not available to the edge proxy or the browser are received. In an embodiment, S460 may further include receiving cancellation frames for one or more of the PUSH resource designators are received from the edge proxy. This is performed in order to avoid sending redundant data from the web accelerator.

At optional S470, the obtained designated resources are forwarded to the edge proxy.

At S480, it is determined whether additional requests should be handled and, if so, execution continues with S410; otherwise, execution terminates.

Figure 5:
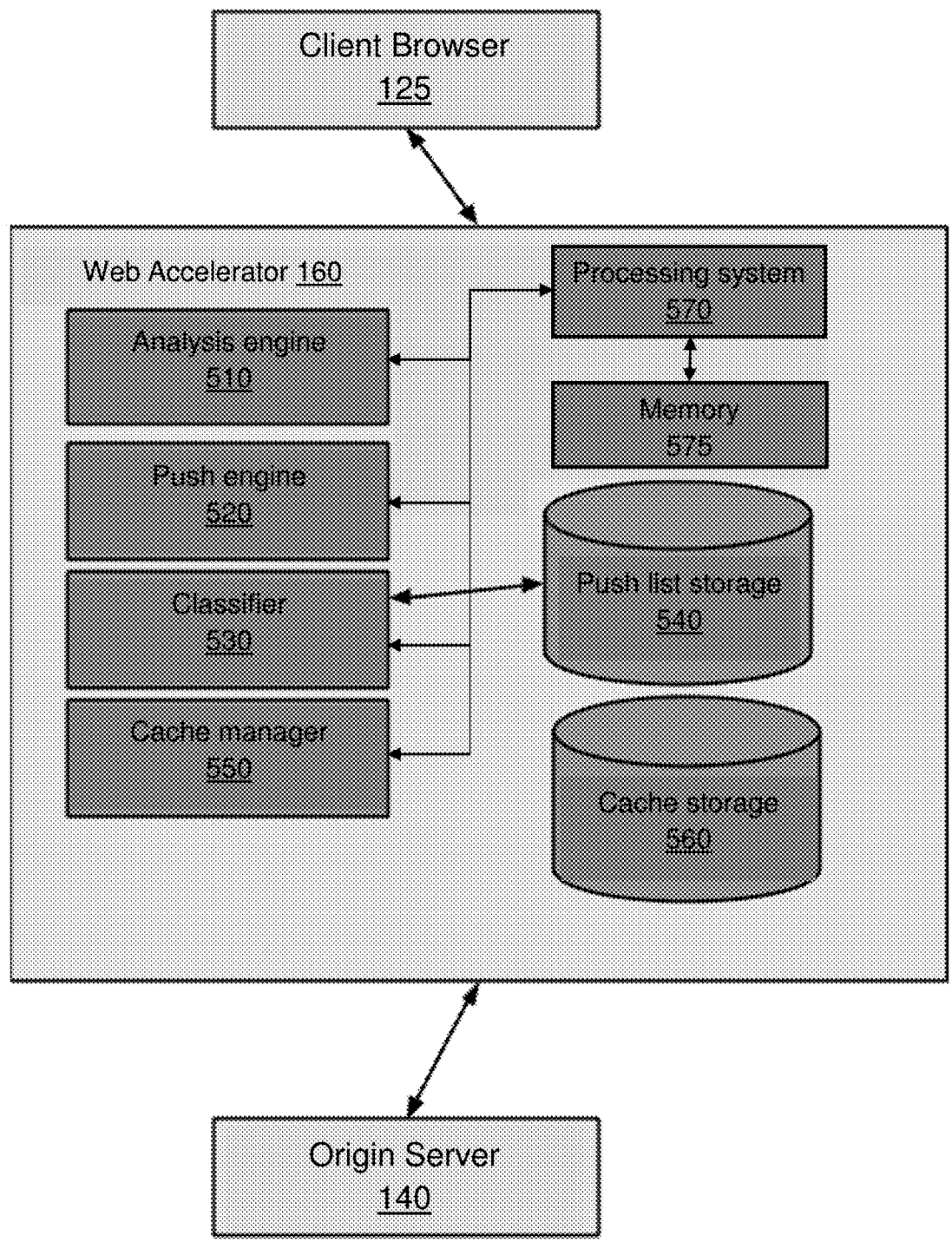
FIG. 5 is a schematic diagram of a web accelerator according to an embodiment.

FIG. 5 is an example schematic diagram 500 illustrating the operation of the web accelerator 160 according to an embodiment. In this embodiment, the web accelerator 160 may be configured to define a PUSH strategy through generation of PUSH lists and issuance of PUSH resource designators. The actual resources designated in the PUSH resource designators are pushed from an edge proxy (e.g., the edge proxy 110) of a CDN to a browser of a client (e.g., the web browser 125 of the client 120). The resources may include HTML documents, images, cascading style sheets (CSS), scripts, or any resources that are typically included in web-pages.

In an embodiment, the web accelerator 160 includes an analysis engine 510, a push engine 520, a classifier 530, a push list storage 540, a cache manager 550, a cache storage 560, and a processing system 570 coupled to a memory 575.

In various embodiments, the analysis engine 510 is configured to analyze captured request-response pairs by causing classification of the request and/or by parsing the response for required resources or portions thereof. In an embodiment, the analysis may be performed off-line. When a resource is identified in the response, that resource is added to a persisted list of resources required for a given HTTP request. In addition to the server side analysis of the captured response, instrumentation code may optionally be injected into the response for the purposes of capturing additional resources added by the client at render-time. The injected code may identify and transmit a list of encountered resources to the origin server (e.g., the origin server 140). This instrumentation code may be added to the periodically captured user responses and the resultant resource list data is optionally combined with the list generated in the server side analysis process.

In an embodiment, the classifier 530 is configured to create indexes (or compound keys) based on data contained in or the context of requests received from the client (e.g., from the client browser 125). An index is used to identify a PUSH list or lists for purposes of storage to and retrieval from the storage 540. Any data in a client's request including, for example, a URL, HTTP headers, and/or the like, can be incorporated into a generated index.

In an embodiment, the classifier 530 is pre-configured with a classification file. The classification file defines headers in the request, in the URL, or in portions thereof that uniquely define a class of responses that the web accelerator 160 has encountered while analyzing previous pairs of requests and response. The classifier 530 is configured to analyze incoming requests based on the contents of the classification file to generate the index. Generation of an index indicates that there is at least one PUSH list including resources that can be pushed immediately to the client for the received request. In a learning mode, the generated indexes are saved with their respective PUSH lists for later retrieval. An embodiment of the classifier 530 for generating indexes can be found in a co-pending U.S. patent application Ser. No. 12/426,909, assigned to the common assignee, the contents of which are hereby incorporated by reference.

Because a PUSH list represents responses related to previously analyzed requests, the responses may be maintained across user sessions and across users. When a resource is encountered in one user session but not in another, the resource may be removed from a 'common' PUSH list used across users. PUSH lists can be maintained either across users or for each unique user or user role in the system. PUSH lists are typically stored in the push list storage 540 along with their associated requests and/or classifications.

In addition, the analysis engine 510 may optionally be configured to filter each PUSH list to exclude off-screen media resources. Such off screen media resources are not required for the rendering of the on screen page and do not accelerate the page rendering process when pushed. Moreover, if off screen resources are pushed, they compete with on screen resources for valuable bandwidth and may result in slower rendering times. Consequently, filtering out of off-screen media resources may reduce computing resource usage and/or accelerate pushing.

Various logical criteria may be used to order resources pushed based on the PUSH lists, i.e., the order that PUSH resource designators are sent to the edge proxy. It should be understood by one skilled in the art that the order in which these criteria is applied can be designed for each request so as to obtain optimal results therefore. In an embodiment, the logical criteria may be combined and/or excluded as desired. Such logical criteria may include, but are not limited to, assigning low priority to elements associated with non-blocking input/output (I/O) behavior, ordering based on response media types, prioritizing above-the-fold resources, combinations thereof, and so on.

One logical criterion that may be used would be to assign a low priority to any HTML elements flagged as 'async,' 'defer,' or that are otherwise known to result in non-blocking input/output (I/O) behavior. In an embodiment, such low priority HTML elements should only be pushed if server response generation is very slow and all other related resources have already been pushed.

Another logical criterion that may be used would be to use an order of response media types. An exemplary and non-limiting order may be: "text/html, text/css, application/javascript, application/x-javascript, text/javascript, Image/." Such an order may be used to order resources of otherwise equal weight. This exemplary list demonstrates favoring screen rendering above other activities, and is not necessarily complete.

Yet another logical criterion that may be used would be to assign higher priority to above-the-fold resources than to below-the-fold resources. Above-the-fold resources are resources that are included in portions of a web page that are visible without scrolling. In contrast, below-the-fold resources are not initially visible in the web page and require scrolling to be viewed. Such below-the-fold resources may be required later than the above-the-fold resources, or may not be required at all (i.e., if a visitor to the web page never scrolls).

In an embodiment, the manner in which resources are pushed to the client browser may be tailored dynamically depending on the context of the response, a current load, and a given connection at the time of each push. Upon receiving a request from a client with a URL that matches a predefined text pattern (such as, e.g., .html, .aspx, jsp, php, or .htm), the URL may be investigated and the associated PUSH list may be determined.

In an embodiment, the push engine 520 may operate in a loop that is unique for each session context. The push engine 520 may issue and send PUSH resource designators based on their order in the PUSH list. While the response is being generated and transmitted, the push engine 520 may be configured to iterate a PUSH list based on one or more iteration criteria. Iteration criteria may include, but are not limited to, determining whether the resource is already in the client cache and, if so, skipping to the next resource.

Iteration criteria may also include determining whether the item is likely to be transferred to the client in time to improve the rendering experience of the client page and, if not, skipping to the next item. The likelihood of improved performance may be based on, but is not limited to, the client's connection speed, a connection latency, a resource type, a file size, and historical client improvement scores. Iteration criteria may further include determining whether the resource blocks client rendering and, if so, pushing and adding the resource to the Bloom filter.

In an embodiment, the web accelerator 160 may be configured to receive captured requests and associated responses. In a further embodiment, the captured requests and responses may be captured by a client device. A request may include, but is not limited to, a uniform resource locator (URL) of a web page selected by a user of the client device. The associated response may be content in the web page associated with the selected URL, including any resources. The resources may be, but are not limited to, documents, files, multimedia content, services, combinations thereof, portions thereof, and any other web resources.

In an embodiment, generation of PUSH lists may be performed by the web accelerator 160 based on the captured requests and associated responses. In particular, the web accelerator 160 may analyze the captured requests and associated responses to identify resources related to each request. Based on the analysis, PUSH lists including at least resource designators for the identified resources may be created. Each PUSH list may be further organized based on one or more order criteria. The order of the PUSH lists provides an order in which resources should be pushed to the client device for a particular request. The order criteria may include logical criteria for prioritizing resources such as, but not limited to, assigning low priority to non-blocking I/O behavior, assigning relative priorities of different types of media, assigning higher priority to above-the-fold resources, and so on.

In another embodiment, each PUSH list may be filtered to remove associations with resources that are not likely to be needed imminently. The filtering may include, but is not limited to, removing resources related to a request or context that are not encountered during every user session, removing off screen resources, and so on. The resources may further be filtered based on tracking of a session (by, e.g., a tracking engine). The tracking-based filtering may include determining whether particular resources are used in one session but not in another session by the same or other users for the request or context. The off-screen resources include resources that are not shown in the initial display of the web page and, consequently, are not needed during initial rendering.

In another embodiment, the web accelerator 160 may be configured to utilize the created PUSH lists upon intercepting a request between the client browser and the origin server. The PUSH lists may be utilized to determine which resources to push to the client browser based on the request. In a further embodiment, a context of the request may be determined, and a PUSH list featuring related resource designators may be utilized for pushing. For example, if the request includes the URL "www.soccerplayers.com," a PUSH list related to soccer content may be utilized.

In a further embodiment, the cache manager 550 may be configured to determine cache contents likely to be in a client cache for the web browser and/or in a cache associated with the edge proxy. To this end, the cache manager may be configured to begin tracking cache contents when a session begins. Based on the tracking, the cache manager 550 is configured to generate and/or update a representative cache including the likely cached contents. The likely cached contents may be determined based on, but not limited to, navigations by a user of the client browser during the current session, Bloom filters for current and/or previous sessions, a cache history from the web accelerator 160, and the like. The cache history may be stored in the cache storage 560.

Determining likely cached contents based on navigations by a user of the web browser may include utilizing page transition maps to identify resources that are likely cached by the web browser given a current web page and/or navigation path through a website. Each page transition map may indicate "from-to" URL contexts (i.e., URLs with associated HTTP headers) representing the previously taken navigation paths through a given website. Page transition data from previous sessions may be collected across users, thereby allowing for determination of likely cached contents based on a current user's navigations during a session. Contents may be likely to be cached based on a particular navigation path if, e.g., the collected page transition data indicates that a number or proportion of client devices having the contents cached after following the navigation path is above a predefined threshold. The navigation paths through a website may be identified by the cache manager 550 and stored in the cache storage 560.

Determining likely cached contents based on Bloom filters may include creating a Bloom filter for each browsing session of a client. As responses are sent during each session, that session's Bloom filter is updated with hash values of URLs associated with the responses. A Bloom filter is a space-efficient probabilistic data structure that is used to test whether an element is a member of a set. False positive matches are possible when using a Bloom filter, but false negatives are not. Thus, a Bloom filter is characterized by a 100% recall rate. Bloom filters may be used, for example, to accelerate performance by quickly determining if data is part of a set and, upon determining that the data is not part of a set, removing requests for the data from any potential database queries.

For purposes of determining likely cached contents, the Bloom filter may be utilized to determine whether a URL in a request belongs to a set including content that is not likely cached. If a fixed length hash of the full URL of a resource passes the Bloom filter, it is determined that the resource is not likely cached, and the resource may be sent to the client browser. The Bloom filter may be further stored in the cache storage 560 and used for requests by the client browser during subsequent sessions.

In an embodiment, the web accelerator 160 may further be configured to utilize generated PUSH lists to optimize asynchronous resource pushing dynamically during client browsing sessions. Upon intercepting a request from the client browser to the origin server, the web accelerator 160 may be configured to identify a URL of the request and to determine a PUSH list based on a context of the identified URL. In a further embodiment, the URL may only be identified if it includes a predefined file extension such as, but not limited to, ".html," ".aspx," "isp," "psp," ".htm," and the like. The context may indicate resources associated with a response and/or with related responses.

Before the origin server provides a response to the request, the web accelerator 160 is configured to issue and send PUSH resource designators, via the push engine 520 to the edge proxy preferable in a prioritized sequence. The prioritized sequence may be based on order criteria for the response and/or for contextually related responses.

In an embodiment, the push engine 520 is configured to generate a special reply. In an embodiment, such a special reply includes a response line and headers. One of the headers in the reply further includes the PUSH resource designators. As an example, the "100-continue HTTP/1.1" message can be included in the special reply. The edge proxy and/or the client browser cannot respond to the special reply.

The web accelerator 160 may further be configured to store, in the push list storage 540, multiple PUSH lists for each web page, request, and/or context. In a further embodiment, which PUSH list should be used for a particular request may be determined based on, but not limited to, client session cookies. As an example, different PUSH lists may be used for landing pages, non-landing pages, and internal pages.

A landing page list is used when the client cookie is not present and the referrer is from an external domain. This indicates that this is a first time cold cache view from an external location (i.e., the start of a cold cache session). A session may start as a cold cache session if the client cache likely does not contain any cached resources. In this case, it is assumed that the client cache is empty and the Bloom filter for the session is initialized.

A non-landing page list is used when the client cookie is present and the referrer is from an external domain (i.e., the start of a warm cache session). A session may start as a warm cache session if the client cache likely contains cached resources. In this case, the client's last known Bloom filter is read and transmitted from a local storage database of the client. This enables cache accuracy across sessions.

An internal page list may be used when the client cookie is present and the referrer is from an internal domain (i.e. a mid-session page request). This list is optionally filtered based on the cache storage 560. In an embodiment, the cache storage 560 may include a page transition map. In this case, resources that have been push on previous pages are removed from the list.

According to an embodiment, the web accelerator 160 includes a processing system 570 coupled to a memory 575. The processing system 570 may comprise or be a component of a processor (not shown) or an array of processors coupled to the memory. The memory contains instructions that can be executed by the processing system 570. The instructions, when executed by the processing system 570, cause the processing system 570 to perform the various functions described herein. The one or more processors may be implemented with any combination of general-purpose microprocessors, multi-core processors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. Further, any component of the web accelerator 160 can be implemented as a processing system defined above.

In addition, any of the analysis engine 510, the push engine 520, the classifier 530, and the cache manager 550 can be implemented as a processing system detailed above.

It should be noted that FIG. 5 is described herein above with respect to a single client device merely for simplicity purposes and without limitation on the disclosed embodiments. Additional client devices may be utilized without departing from the scope of the disclosure.

It should be further noted that FIG. 5 is described herein above with respect to an independent web accelerator 160 merely for simplicity purposes and without limitation on the disclosed embodiments. The web accelerator 160 may be included in or communicatively connected to a server and/or proxy (e.g., as described with respect to FIG. 1 herein above) without departing from the scope of the disclosure.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

While the present disclosure has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the disclosure. Furthermore, the foregoing detailed description has set forth a few of the many forms that the disclosed embodiments can take. It is intended that the foregoing detailed description be understood as an illustration of selected forms that the disclosure can take and not as a limitation to the definition of the disclosed embodiments.

What is claimed is:

1. A method for accelerating content delivery over a content delivery network (CDN), comprising:
   determining, by a web accelerator located outside of the CDN and functionally separate from an origin server, the web accelerator being coupled between the origin server and the CDN so that at least some communication from the origin server passes from the origin server through the web accelerator and then from the web accelerator through the CDN, based on a received hypertext transfer protocol (HTTP) request, the request being intercepted at the web accelerator outside of the CDN, a PUSH list, wherein the PUSH list includes at least one resource that can be immediately provided to a web browser without requesting the at least one resource from an origin server; and issuing, by the web accelerator, from outside of the CDN, based on the PUSH list, at least one PUSH resource designator to an edge proxy, wherein each PUSH resource designator indicates one of the at least one resource, wherein the edge proxy is within the CDN and is connected in geographic proximity to a client running the web browser, wherein the origin server and the edge proxy communicate over the CDN.

2. The method of claim 1, wherein the received HTTP request includes a special header indicating that the edge proxy has established a HTTP version 2 (HTTP/2) session with the client.

3. The method of claim 1, further comprising:
forwarding the received HTTP request to the origin server.

4. The method of claim 3, wherein forwarding the received HTTP request to the origin server further comprises:
determining whether the origin server supports HTTP version 2 (HTTP/2);
terminating a HTTP/2 connection, when it is determined that the origin server does not support HTTP/2; and
forwarding the HTTP request to the origin server over a HTTP version 1 (HTTP/1) connection.

5. The method of claim 1, wherein issuing the at least one PUSH resource designator further comprises:
sending a special reply to the edge proxy, wherein the special reply includes a header having the at least one issued PUSH resource designator.

6. The method of claim 1, further comprising:
receiving an indication that a PUSH resource designator of the at least one PUSH resource designator cannot be fulfilled by the edge proxy;
receiving, from the origin server, a resource corresponding to the unfulfilled PUSH resource designator; and
sending the received resource to the edge proxy.

7. The method of claim 1, further comprising:
capturing a plurality of HTTP request-response pairs;
analyzing the plurality of HTTP request-response pairs to determine at least one common designated resource; and
generating a common PUSH list based on the at least one common designated resource.

8. The method of claim 7, further comprising:
indexing the common PUSH list based on any of: the requests of the plurality of request-response pairs, and a context of the requests.

9. The method of claim 8, wherein determining, based on the received request, the PUSH list further comprises:
retrieving a common PUSH list using an index computed based on the received HTTP request.

10. The method of claim 1, wherein the connection between the client and the origin server over the CDN is facilitated using HTTP version 2.

11. The method of claim 1, wherein the connection between the client and the origin server over the CDN is facilitated using a hybrid HTTP version 2 and HTTP version 1 session.

12. The method of claim 1, wherein each PUSH resource designator is a PUSH-PROMISE frame.

13. The method of claim 1, wherein a plurality of PUSH resource designators are aggregated in a list including a plurality of data chunks, wherein each data chunk represents required headers and URL of a resource to be pushed.

14. A non-transitory computer-readable medium having stored thereon instructions for executing the method of claim 1.

15. A system for accelerating content deliver over a content delivery network (CDN), comprising:
a processing unit; and
a memory, the memory containing instructions that, when executed by the processing unit, configure the system to:
determine, by a web accelerator located outside of the CDN and functionally separate from an origin server, the web accelerator being coupled between the origin server and the CDN so that at least some communication from the origin server passes from the origin server through the web accelerator and then from the web accelerator through the CDN, based on a received hypertext transfer protocol (HTTP) request, the request being intercepted at the web accelerator outside of the CDN, a PUSH list, wherein the PUSH list includes at least one resource that can be immediately provided to a web browser without requesting the at least one resource from an origin server; and
issue, by the web accelerator, from outside of the CDN, based on the PUSH list, at least one PUSH resource designator to an edge proxy, wherein each PUSH resource designator indicates one of the at least one resource, wherein the edge proxy is within the CDN and is connected in geographic proximity to a client running the web browser, wherein the origin server and the edge proxy communicate over the CDN.

16. The system of claim 15, wherein the received HTTP request includes a special header indicating that the edge proxy has established a HTTP version 2 (HTTP/2) session with the client.

17. The system of claim 15, wherein the system is further configured to:
forward the received HTTP request to the origin server.

18. The system of claim 17, wherein the system is further configured to:
determine whether the origin server supports HTTP version 2 (HTTP/2);
terminate a HTTP/2 connection, when it is determined that the origin server does not support HTTP/2; and
forward the HTTP request to the origin server over a HTTP version 1 (HTTP/1) connection.

19. The system of claim 15, wherein the system is further configured to:
send a special reply to the edge proxy, wherein the special reply includes a header having the at least one issued PUSH resource designator.

20. The system of claim 15, wherein the system is further configured to:
receive an indication that a PUSH resource designator of the at least one PUSH resource designator cannot be fulfilled by the edge proxy;
receive, from the origin server, a resource corresponding to the unfulfilled PUSH resource designator; and
send the received resource to the edge proxy.

21. The system of claim 15, wherein the system is further configured to:
- capture a plurality of HTTP request-response pairs;
- analyze the plurality of HTTP request-response pairs to determine at least one common designated resource; and
- generate a common PUSH list based on the at least one common designated resource.

22. The system of claim 21, wherein the system is further configured to:
- index the common PUSH list based on any of: the requests of the plurality of request-response pairs, and a context of the requests.

23. The system of claim 22, wherein the system is further configured to:
- retrieve a common PUSH list using an index computed based on the received HTTP request.

24. The system of claim 15, wherein the connection between the client and the origin server over the CDN is facilitated using HTTP version 2.

25. The system of claim 15, wherein the connection between the client and the origin server over the CDN is facilitated using a hybrid HTTP version 2 and HTTP version 1 session.

26. The system of claim 15, wherein each PUSH resource designator is a PUSH-PROMISE frame.

27. The system of claim 15, wherein a plurality of PUSH resource designators are aggregated in a list including a plurality of data chunks, wherein each data chunk represents required headers and URL of a resource to be pushed.

* * * * *